(12) United States Patent
Haar et al.

(10) Patent No.: US 10,932,414 B2
(45) Date of Patent: Mar. 2, 2021

(54) CONCAVE ADJUSTMENT SYSTEM IN A COMBINE HARVESTER TWIN AXIAL-FLOW CROP PROCESSOR

(71) Applicant: AGCO Corporation, Duluth, GA (US)

(72) Inventors: William Ryan Haar, Valley Center, KS (US); Nicholas H. Williams, Hesston, KS (US); Joseph M. Biggerstaff, Wichita, KS (US)

(73) Assignee: AGCO Corporation, Duluth, GA (US)

( * ) Notice: Subject to any disclaimer, the term of this patent is extended or adjusted under 35 U.S.C. 154(b) by 203 days.

(21) Appl. No.: 16/155,420

(22) Filed: Oct. 9, 2018

(65) Prior Publication Data
US 2019/0159403 A1 May 30, 2019

Related U.S. Application Data

(60) Provisional application No. 62/591,883, filed on Nov. 29, 2017.

(51) Int. Cl.
*A01F 12/28* (2006.01)
*A01F 7/06* (2006.01)
*A01F 12/26* (2006.01)

(52) U.S. Cl.
CPC ............ *A01F 12/28* (2013.01); *A01F 7/06* (2013.01); *A01F 12/26* (2013.01)

(58) Field of Classification Search
CPC ............ A01F 12/28; A01F 12/26; A01F 7/06
See application file for complete search history.

(56) References Cited

U.S. PATENT DOCUMENTS 3,631,862 A * 1/1972 Rowland-Hill ......... A01F 12/28
460/109
3,696,815 A * 10/1972 Rowland-Hill ........... A01F 7/06
460/69

(Continued)

FOREIGN PATENT DOCUMENTS

| GB | 1478545 A | 7/1977 |
| GB | 2356546 A1 | 5/2010 |
| WO | 2018/185035 A1 | 10/2018 |

OTHER PUBLICATIONS

UK Intellectual Property Office, Search Report for related UK Patent Application No. GB1813809.9, dated Feb. 21, 2019.

*Primary Examiner* — Arpad Fabian-Kovacs (57) ABSTRACT

A combine harvester including a frame and two axial-flow crop processing rotors mounted to the frame. An inner support structure is located between the two rotors and mounted to the frame by a first linkage. Two outer support structures are located outboard of the two rotors and mounted to the frame by respective second and third linkages. The inner support structure and two outer support structures carry first and second pluralities of concave grate segments at a radial distance from the respective rotors. A concave adjustment system includes a first actuator coupled to the first linkage which is configured to raise and lower the inner support structure. A second actuator is coupled to the second and third linkages and is configured to raise and lower the two outer support structures. The first linkage includes a first rockshaft mounted to the frame and aligned perpendicular to the rotation axis. The second and third linkages include and share a second rockshaft that is arranged coaxial to the first rockshaft.

13 Claims, 7 Drawing Sheets

(56) References Cited

U.S. PATENT DOCUMENTS

| | | | | |
|---|---|---|---|---|
| 3,949,761 | A * | 4/1976 | Mortier | A01F 12/28 460/109 |
| 3,957,058 | A * | 5/1976 | Komancheck | A01F 7/06 460/108 |
| 4,004,404 | A * | 1/1977 | Rowland-Hill | A01F 7/06 56/14.6 |
| 4,018,232 | A * | 4/1977 | Rowland-Hill | A01F 7/06 460/84 |
| 4,031,901 | A * | 6/1977 | Rowland-Hill | A01F 12/24 460/108 |
| 4,075,823 | A * | 2/1978 | Rowland-Hill | A01F 7/06 460/108 |
| 4,078,571 | A * | 3/1978 | Todd | A01F 7/06 460/66 |
| 4,249,543 | A * | 2/1981 | Rowland-Hill | A01F 7/06 460/108 |
| 4,330,000 | A * | 5/1982 | Peiler | A01F 12/28 460/109 |
| 4,375,221 | A * | 3/1983 | Bernhardt | A01F 12/28 460/109 |
| 4,711,075 | A * | 12/1987 | Strong | A01F 12/24 460/110 |
| 4,711,252 | A * | 12/1987 | Bernhardt | A01F 12/28 460/107 |
| 5,190,497 | A * | 3/1993 | Heidjann | A01F 12/18 460/62 |
| 5,342,239 | A * | 8/1994 | West | A01F 12/22 460/110 |
| 8,133,100 | B2 * | 3/2012 | Regier | A01F 12/181 460/109 |
| 8,133,101 | B2 * | 3/2012 | Regier | A01F 12/181 460/109 |
| 8,628,390 | B2 * | 1/2014 | Baltz | A01F 12/24 460/109 |
| 10,015,930 | B2 * | 7/2018 | Van Hullebusch | A01D 75/182 |
| 2007/0178951 | A1 * | 8/2007 | Voss | A01F 12/28 460/109 |
| 2009/0233663 | A1 * | 9/2009 | Yanke | A01F 12/28 460/68 |
| 2016/0316631 | A1 * | 11/2016 | Davenport, III | A01F 12/26 |
| 2017/0164560 | A1 | 6/2017 | Van Hullebusch | |
| 2019/0150366 | A1 * | 5/2019 | Flickinger | A01F 7/02 |

* cited by examiner

CONCAVE ADJUSTMENT SYSTEM IN A COMBINE HARVESTER TWIN AXIAL-FLOW CROP PROCESSOR

CROSS REFERENCE TO RELATED APPLICATION

This application claims the benefit of U.S. Provisional Application No. 62/591,883 filed Nov. 29, 2017, which is hereby incorporated by reference in its entirety.

BACKGROUND

Field of Invention

The present invention relates to combine harvesters that include a twin-rotor, axial-flow, crop processor for threshing and/or separating cut crop material. In particular the invention relates to a concave adjustment system for adjusting a clearance between a concave and an associated rotor at both a material inlet side and a material outlet side.

Discussion of Related Art

Twin axial-flow or rotary combine harvesters usually have a pair of crop processing rotors each arranged side-by-side and each having a rotation axis which is substantially parallel to the longitudinal axis of the harvester. The rotors usually perform both the threshing and separating action upon the cut crop flow delivered thereto.

Each crop processing rotor is mounted in a respective rotor housing which is generally cylindrical and which includes an arcuate grate or concave in the lower section to allow separated grain to fall onto an underlying collection pan. Enclosing curved cover plates are provided in an upper section of the housing.

Crop material is fed into a front inlet section where the crop material is engaged by flighting elements on the rotor. The crop material is conveyed as a ribbon or mat in a generally rearward axial and helical path in the space between the rotor and the rotor housing. Axial conveyance of the crop material is driven by the interaction between guide vanes provided on the inside surface of the upper cover plates and threshing and separating elements provided on the rotor. Threshing of the crop material and the subsequent separation of the grain therefrom is mostly carried out in the lower portions of the helical path by the interaction between the threshing and separating elements respectively and the concave, the clearance between which is adjustable. Separated crop material passes by gravity through the grate whereas the longer bulkier straw residue is conveyed via an outlet or discharge section at the rear of the housing.

To obtain the most effective threshing, it is important to regulate and maintain the optimum clearance between the concave and the threshing elements on the rotors during operation. The optimum separation depends upon the crop being harvested and the conditions at the time of harvest. A concave clearance that is too small will result in grain damage, whereas an excessive concave clearance will tend to reduce the threshing effectiveness leading to losses.

A concave for a conventional rotary processor is usually fixed relative to the rotor along one side, wherein adjustment of the clearance is performed by moving the opposite side by an appropriate connected linkage. The adjusted side of the concave typically corresponds to the side where the crop material enters the concave region, the crop inlet side.

Due to the arcuate profile of the rotor envelope and the concave, such single-sided adjustment offers limited scope to deliver the optimum clearance and these downsides are recognised. Attempts have been made to offer concave adjustment systems that adjust the clearance by movement of both the crop inlet and outlet sides. For example, DE-40 00 909 A1 discloses an adjustment mechanism in which both the inlet and outlet sides of the concave are adjusted.

There is a need for a concave adjustment mechanism that offers the advantages of a dual-sided adjustment system for a twin-rotor processor whilst being simple in construction and robust during operation.

SUMMARY OF THE INVENTION

According to one aspect of the present invention there is provided a combine harvester comprising:
a frame;
two axial-flow crop processing rotors mounted to the frame and arranged side-by-side and each having a longitudinal rotation axis;
an inner support structure located between, and extending parallel to, the two rotors, the inner support structure being moveably mounted to the frame by a first linkage;
two outer support structures located outboard of, and extending parallel to, the two rotors, the support rails being moveably mounted to the frame by respective second and third linkages;
wherein the inner support structure and two outer support structures are configured to carry first and second pluralities of concave grate segments at a radial distance from the respective rotors; and,
a concave adjustment system comprising a first actuator coupled to the first linkage and configured to raise and lower the inner support structure, and a second actuator coupled to the second and third linkages and configured to raise and lower said two outer support structures;
wherein the first linkage comprises a first rockshaft mounted to the frame and aligned substantially perpendicular to the rotation axis, and wherein the second and third linkages comprise and share a second rockshaft that is arranged coaxial to the first rockshaft.

The combine harvester comprises an inner support structure between two outer support structures, which structures support concave segments therebetween. The inner support structure and the outer support structures can be adjusted up and down to adjust the concave clearance along both the crop inlet and crop outlet sides.

When installed, the concave grate segments are preferably hinged at an inboard side to the inner support structure and secured at an outboard side to one of said two outer support structures. The inner support structure preferably comprises a pair of laterally spaced-apart rails upon which hooks provided in the concave segments simply engage. The outer sides of the concave segments may be secured to the outer support structures in a host of different ways including, by way of example only, by bolts, clips or pins.

The invention lends itself well to twin rotor processors regardless of the direction of rotation of the rotors. However, in a preferred embodiment the two rotors are driven in mutually opposite directions wherein an inboard side of the rotors turn upwardly meaning that the outboard sides of the concave grate segments correspond to a concave inlet and the inboard sides of the concave grate segments correspond to a concave outlet.

In one embodiment the combine harvester further comprises a releasable locking mechanism which is configured to lock the first rockshaft to the second rockshaft. By locking the first and second rockshafts together, the adjustment of the concave inlet is tied to the concave outlet. Such a mode of operation may be more suited to inexperienced operators wherein number of adjustable operating parameter is more limited thus offering a simpler decision process than when the rockshafts can be adjusted independently.

The releasable locking mechanism may be configured to selectively lock the first rockshaft to the second rockshaft in a plurality of alternative relative positions.

BRIEF DESCRIPTION OF THE DRAWINGS

Further advantages of the invention will become apparent from reading the following description of specific embodiments of the invention with reference to the appended drawings in which.

DETAILED DESCRIPTION OF EXAMPLE EMBODIMENTS

An example embodiment of the invention will now described. Relative terms such as 'front', 'rear', 'left', 'right', 'vertical', 'horizontal', 'longitudinal' and 'transverse' will be made with reference to the longitudinal axis of a combine harvester travelling in the normal forward direction of travel indicated by arrow F in FIG. 1. The terms 'direction of conveyance', 'upstream', and 'downstream' are made with reference to the general flow of crop material through the combine harvester. The terms 'axial', 'radial' and 'tangential' will be used in relation to the rotation axis of the processing rotors.

Figure 1:
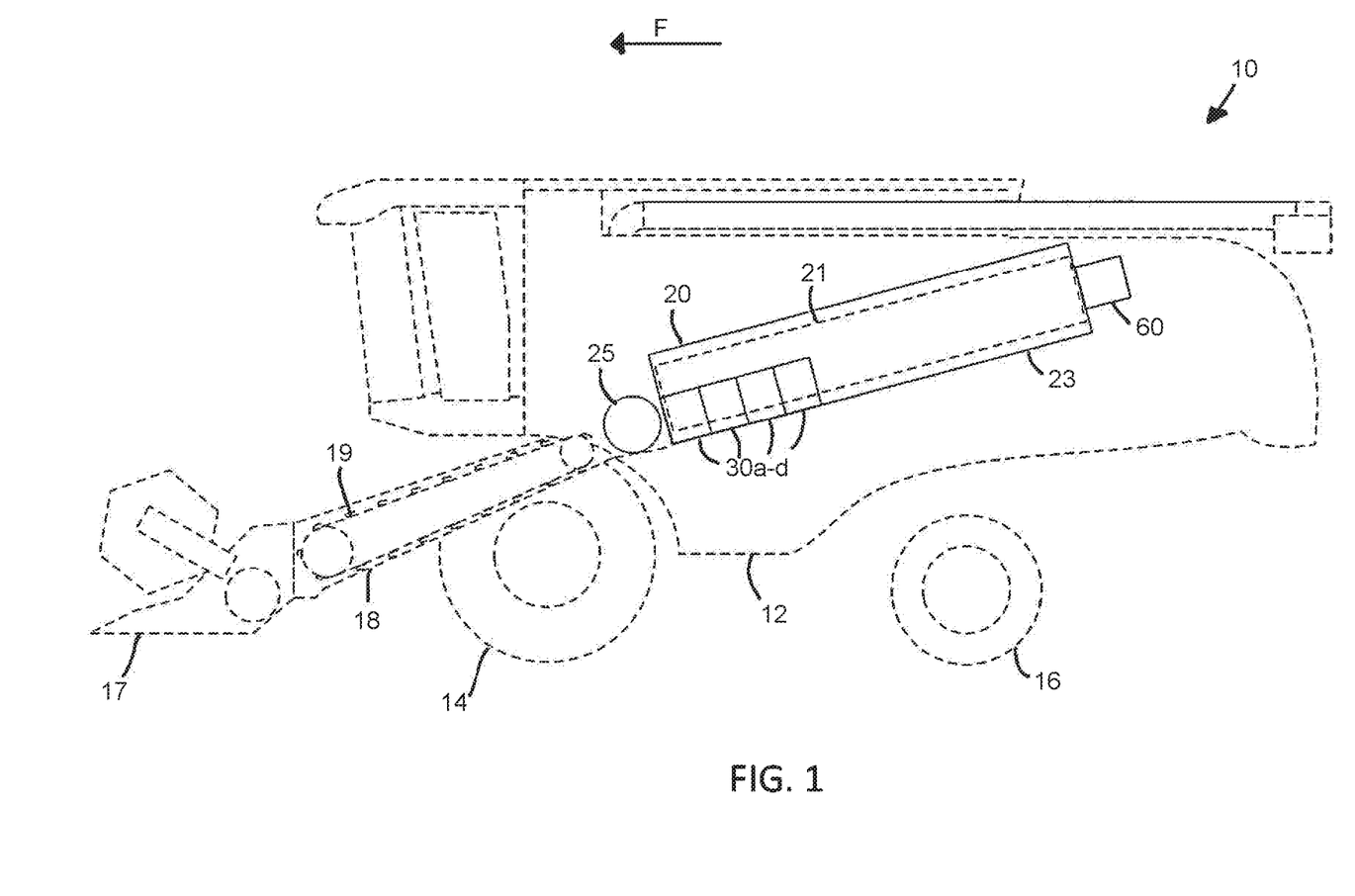
FIG. 1 is schematic side view of a combine harvester which includes a twin rotor crop processor in accordance with an embodiment of the invention.

With reference to FIG. 1 a combine harvester 10 includes a frame or chassis 12, front wheels 14 and rear steerable wheels 16. A cutting header 17 is detachably supported on the front of a feederhouse 18 which is pivotable about a transverse axis to lift and lower the header 17 in a conventional manner.

The combine 10 is driven in a forward direction F across a field of standing crop in a known manner. The header 17 serves to cut and gather the crop material before conveying such into feederhouse 18 and elevator 19 housed therein. At this stage the crop stream is unprocessed. It should be understood that combine harvesters are employed to harvest a host of different crops including cereal, rice, corn and grass seed. The following description will make reference to various parts of the cereal crop stream but it should be understood that this is by way of example only and does not by any means limit the applicability of the invention to harvester other harvesting crops.

The cut crop stream is conveyed rearwardly from the feederhouse 18 to a processor designated generally at 20. The processor 20 includes a pair of axial flow threshing and separating rotors 21,22 which are each housed side-by-side inside a respective rotor housing 23 and are fed at their front end by a feed beater 25. The rotors serve to thresh the crop stream in a front 'threshing' region, separate the grain therefrom in a rear 'separating' region, and eject the straw residue through the rear of the machine either directly onto the ground in a windrow or via a straw chopper.

Each rotor housing 23 is generally cylindrical and is made up of an opaque upper section and a foraminous lower section which includes a set of side-by-side arcuate concave grate segments which allow the separated material to fall by gravity onto a grain collection pan located below for onward conveyance to a cleaning system (not shown). Guide vanes (not shown) are secured to the inside of the rotor housing and serve, in conjunction with the crop engaging elements on the rotor, to convey the stream of crop material in a generally rearward spiral path from front to rear.

Figure 2:
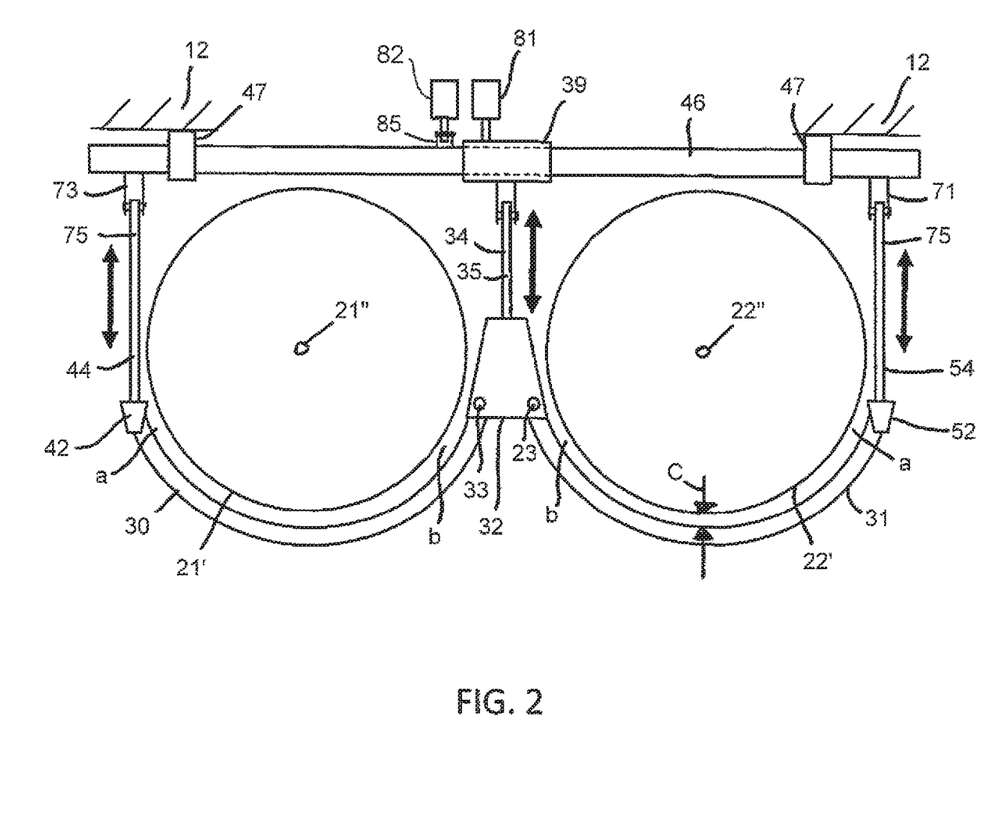
FIG. 2 is a schematic rear view of the twin rotor processor of FIG. 1 and showing the concave adjustment system.
Figure 3:
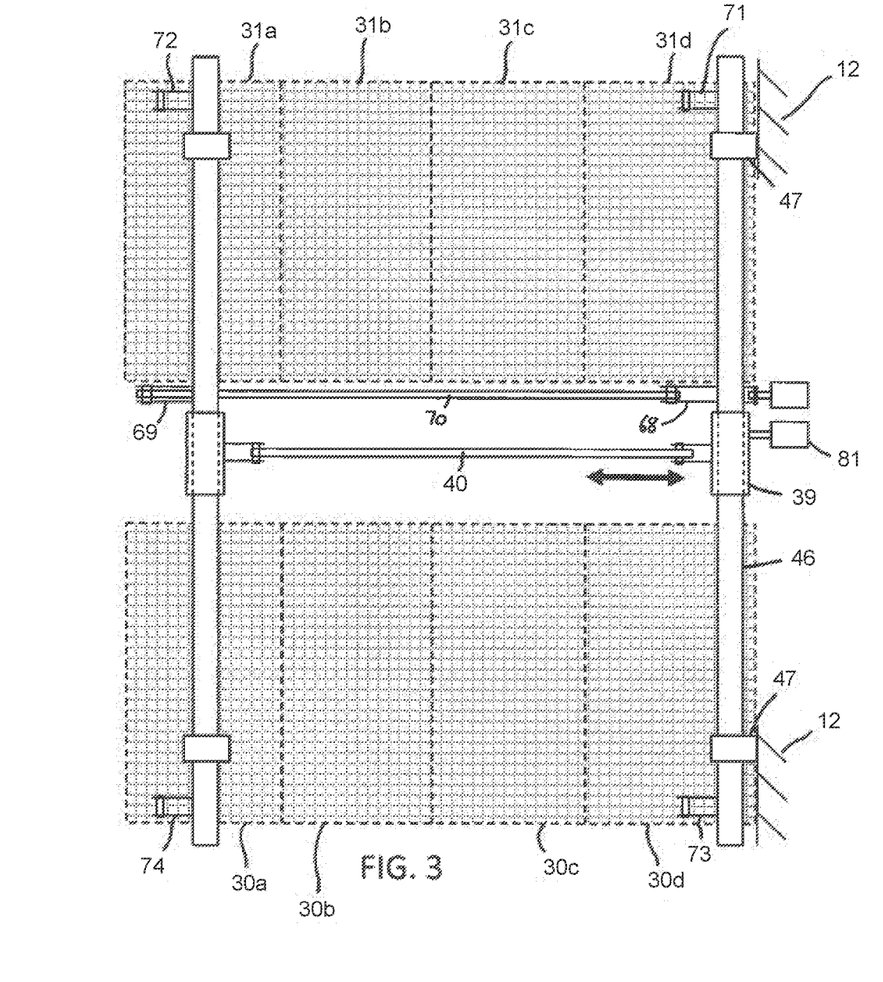
FIG. 3 is a schematic plan view of the twin rotor processor of FIG. 1 and showing the concave adjustment system.
Figure 8:
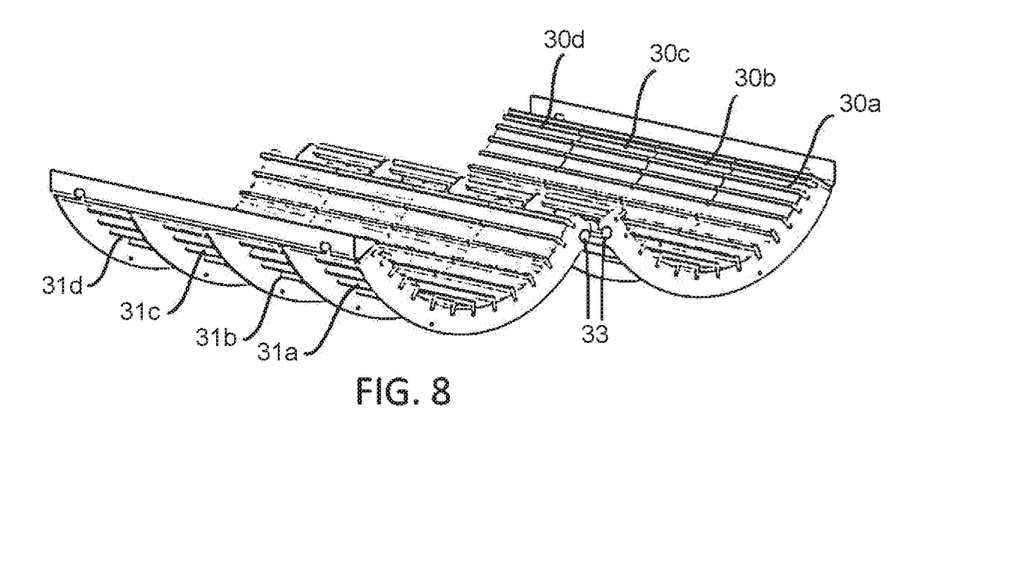
FIG. 8 is a perspective view of the sets of concave grate segments mounted to the inner and outer support structures; and, FIG. 9 is a perspective view of one concave grate segment shown mounted to the inner and outer support structures.

With reference also to FIGS. 2, 3 and 8, the sets 30,31 of concave grate segments are positioned underneath the respective rotors 21,22 and wrap around a portion of the cylindrical swept envelope 21', 22'. The individual concave grate segments 30*a-d*,31*a-d* are carried upon support structures that are movably mounted to the frame 12 so as to allow adjustment of the clearance between the segments 30*a-d*,31*a-d* and the rotors 21,22.

FIGS. 2 and 3 illustrates the concave support structure and concave adjustment system in schematic form, whereas FIGS. 4 to 9 show the concave adjustment system in more detail. With reference to FIG. 2, the swept envelopes 21', 22' of the two crop processing rotors 21,22 are shown. The rotors 21,22 are arranged side-by-side and each have a substantially longitudinal, or fore and aft, rotation axis 21", 22".

An inner support structure 32 is positioned between the two rotors 21,22 and is movably mounted to the frame 12 by a first linkage 34 which includes a pair of hanger rods 35, one fore and one aft, which are connected at their lower ends to the inner support structure 32. Two outer support structures 42,52 are located outboard of the two rotors 21,22 and are movably mounted to the frame 12 by respective second and third linkages 44,54.

The sets of concave grate segments 30,31 are carried by the inner support structure 32 on respective rails 33 and two outer support structures 42,52 at a radial distance C from the respective rotors 21,22. A adjustment system is provided to control movement of the concave segments and will be discussed in more detail below.

It should be understood that the frame 12 is represented in simple schematic form in the drawings. In practice, the frame 12 may comprise any component of the vehicle chassis that is fixed with respect to the engine for example. Although such level of detail is not illustrated, the frame 12 typically comprises longitudinal stringers and rigidifying cross-members therebetween. The rotors 21,22, associated rotor housing and concave linkages 34,44,54 may be supported by such cross-members and/or transverse bulkheads secured (by welding for example) thereto. A person of ordinary skill will appreciate that the frame 12 may be constructed in a host of different ways.

Electric actuators are coupled to the respective linkages 34,44,54 to raise and lower the inner and outer support structures 32,42,52 and, as a result, adjust the concave clearance C. A rotor drive system, represented generically at 60, is operable to drive the rotors 21,22 in mutually opposite directions. Viewed from the front, the left-hand rotor 21 rotates clockwise (as indicated by the arrow) and the right-hand rotor 22 rotates anticlockwise. As such, the inboard side of the rotors 21,22 turn upwardly. However, it should be appreciated that the rotors 21,22 may be operable to rotate in the opposite direction to that described without departing from the scope of the invention.

Although electric actuators are employed in the illustrated embodiment to raise and lower the support structures 32,42, 52 it should be appreciated that other types of actuator may instead be used, such as hydraulic actuators for example.

The crop material enters the space between the concave and the rotor along the outboard side 'a' and exits along the inboard side 'b'. The concave adjustment system advantageously permits independent adjustment of the concave clearance C along the concave "inlet" side 'a' and along the concave "outlet" side 'b' thus catering for different crops and harvesting conditions with more flexibility.

Figure 9:
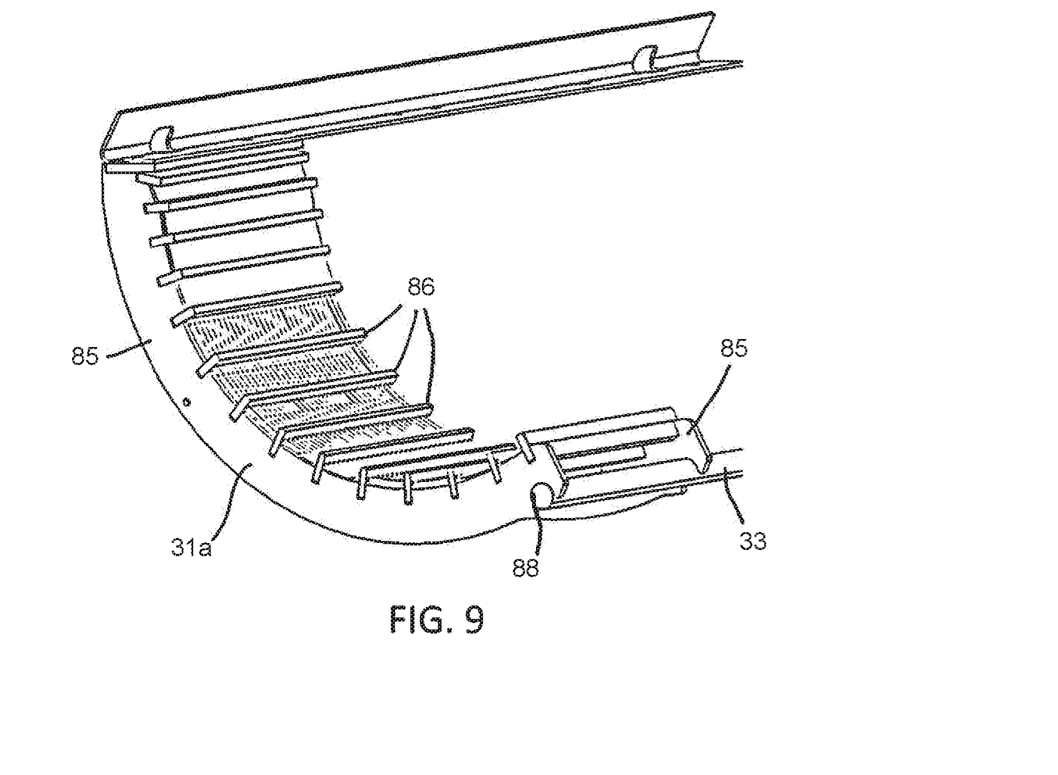

Turning briefly to FIGS. 8 and 9, the inboard side of all right-hand concave segments 30a-d is hinged to one of rails 33. The inboard side of all left-hand concave segments 31a-d is hinged to the other of rails 33. Best seen in FIG. 9 which shows only one concave segment 31a, each segment comprises a pair of mutually spaced arcuate plates 85 which are bridged by a series of grate bars 86 as in known machines. The inboard side of the arcuate plates is provided with a cut-out or hook 88 which engages the associated rail 33.

With reference to FIGS. 2-5, the hanger rods 35 are pivotally connected at their upper ends to distal ends of first arms of respective bell cranks 36,37 which themselves are pivotally mounted to the frame 12 so as to pivot about transverse axes $x_1$ and $x_2$ respectively. Second arms of the bell cranks 36,37 are coupled together by a longitudinally-extending tie-bar 40 which couples adjustment movement at the front of the inner support structure 32 to adjustment movement at the rear. It should be appreciated that the majority of the weight of the inner support structure 32 and the concave sets 30,31 carried thereon is carried by the bell cranks 36,37.

Figure 4:
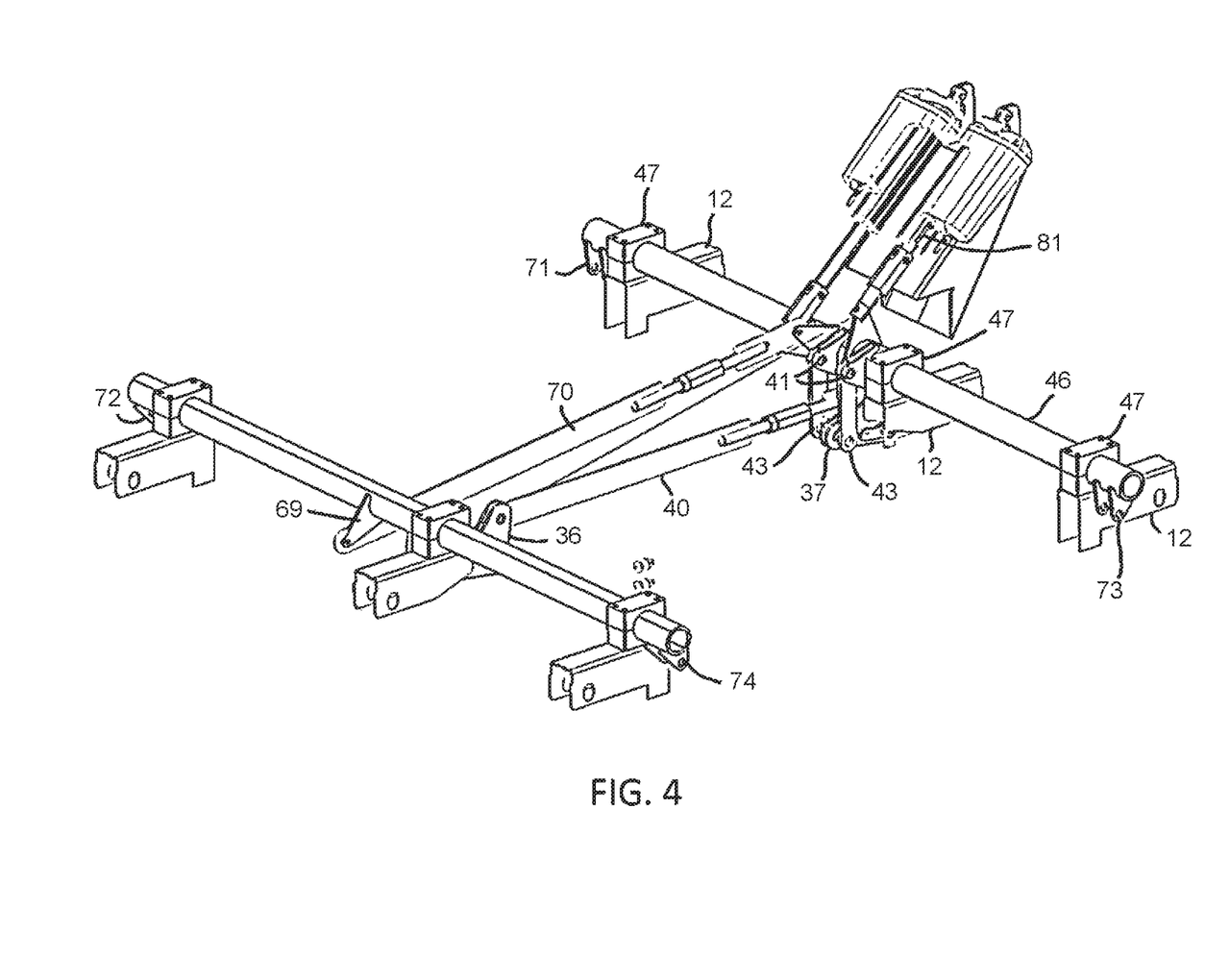
FIGS. 4 and 5 are perspective front views of a concave adjustment system in accordance with an embodiment of the invention, shown in isolation without the rotors.
Figure 5:
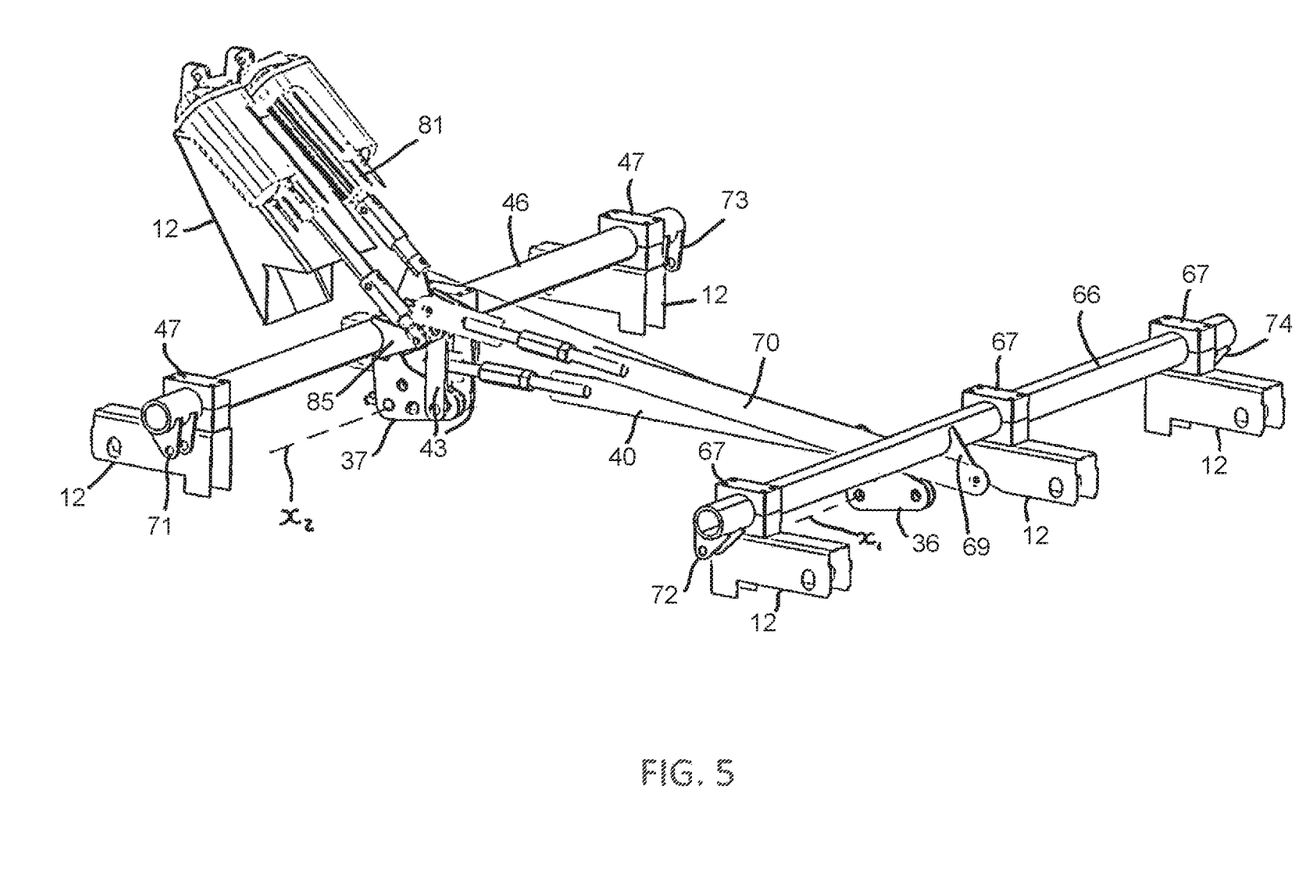
Figure 6:
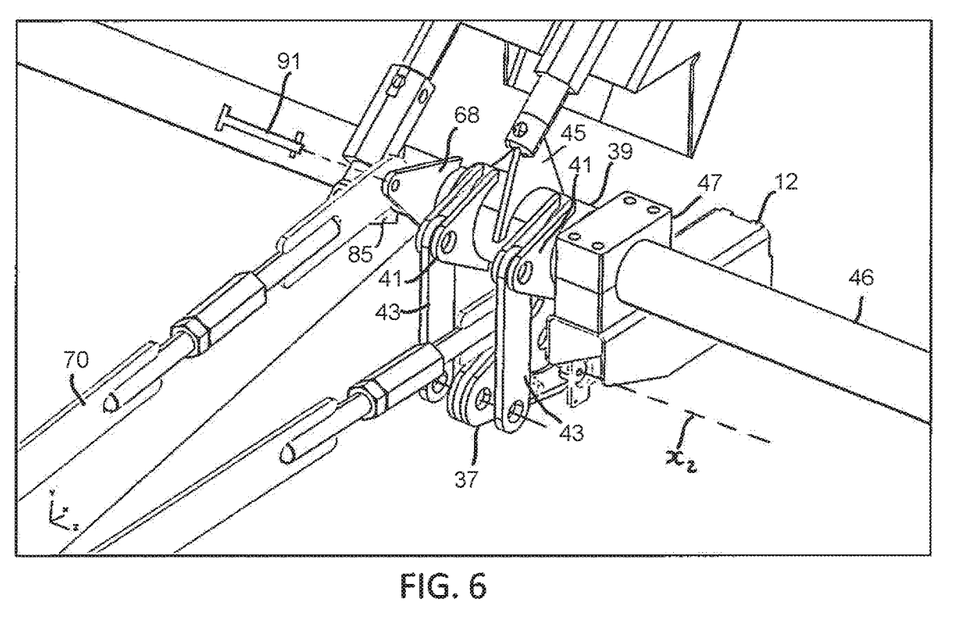
FIG. 6 is an enlarged perspective view of part of the coaxial first and second rockshafts of the concave adjustment system of FIG. 4.

The first linkage 34 also comprises a transversely-aligned first rockshaft 39 that is rotatably journaled upon a second rockshaft 46 which forms part of the second and third linkages 44,54, to be described in more detail below. To be clear, the second and third linkages 44,54 share the second rockshaft 46 which is journaled upon frame 12 by bearings 47. The first rockshaft 39 is a hollow tube or sleeve that is coaxial with the second rockshaft 46.

Figure 7:
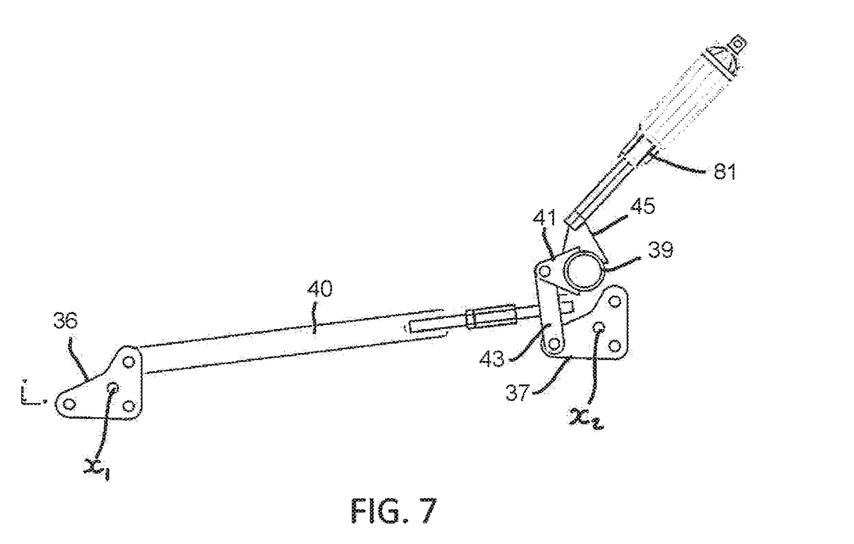
FIG. 7 is a side view of part of the first linkage.

The first rockshaft 39 comprises a pair of spaced rockshaft cranks 41, wherein distal end of each crank 41 is connected to rear bell crank 37 by a pair of spaced links 43. It should be appreciated that the bolts or pins used to couple the links 43 to the rockshaft cranks 41 and bell crank 37 have been omitted from the drawings.

A first electric actuator 81 is connected between the frame 12 and a first input crank 45 provided on the first rockshaft 39. Extension of actuator 81 translates (via first linkage 34) into lowering of the inner support structure 32 and opening of the concave spacing along the crop outlet side 'b'. Retraction of actuator 81 translates into raising of the inner support structure 32 and closing of the concave spacing along the crop outlet side 'b'. Although shown as being connected to the aft bell crank 37, first actuator 81 could instead be connected to the fore bell crank 36 or indeed directly to any part of first linkage 34.

The adjustment mechanism associated with the outer support structure 42,52 and corresponding second and third linkages 44,54 will now be described.

As mentioned above, the second and third linkages 44,54 share the second rockshaft 46 which is journaled upon frame 12 by bearings 47. The second and third linkages 44,45 also comprise and share a third rockshaft 66 which is displaced longitudinally from, and forwardly of, first and second rockshafts 39,46. The third rockshaft 66 is journaled to frame 12 by bearings 67 so as to be rotatable around its axis.

The third rockshaft 66 is coupled to the second rockshaft 46 by respective cranks 68,69 and a longitudinally-extending tie-bar 70 which couples adjustment movement at the front of the outer support structures 42,52 to adjustment movement at the rear.

Turning briefly to FIGS. 8 and 9, the concave segments 30a-d,31a-d are secured at their outboard end to the respective outer support structures 42,52 by bolts or other suitable means. The outer support structures 42,42 are each suspended from respective fore and aft cranks 71,72,73,74 provided at outboard ends of the second and third rockshafts 46,66 by respective outboard hangers 75.

Referring back to FIGS. 2-5, a second electric actuator 82 is connected between the frame 12 and a second input crank 85 that is provided on second rockshaft 46. Retraction of actuator 82 rotates second and third rockshafts 46,66 so as to raise the outboard hangers 75 and the outer support structures 42,52 thus closing of the concave spacing along the crop inlet side 'a' of the rotors 21,22. Extension of actuator 82 translates into lowering of the left-hand outer support structures 42,52 thus opening of the concave spacing along the crop inlet side 'a' of the rotors 21,22. Although shown as being connected directly to the input crank 85, second actuator 82 could instead be connected to a different crank that is keyed to the second rockshaft 46 or third rockshaft 66 or indeed directly to any part of the second or third linkages 44,54.

In one embodiment of the invention, a releasable locking mechanism is provided and configured to lock the first rockshaft 39 to the second rockshaft 46. The locking mechanism may be as simple as a bolt or pin 91 that is inserted through holes provided in cranks that extend from the first and second rockshafts 39,46. In one example one of the rockshaft cranks 41 is releasably coupled to crank 68 so as to rotationally lock the first rockshaft 39 to the second rockshaft 46. Alternatively, dedicated cranks or lugs (not shown) may be provided on the respective rockshafts 39,46 to permit mechanical locking therebetween by means of bolts, pins or chains for example. The cranks may be provided with a plurality of holes to allow the relative rotational position of the rockshafts to be fixed in one of a plurality of optional positions.

When the coaxial rockshafts 39,46 are rotationally locked together, the adjustment of the concave inlet is tied to the concave outlet with a fixed ratio. Furthermore, in this mode, only one actuator is required to control the concave clearance and, as such, the other (redundant) actuator is preferably disconnected.

It should be emphasized that the above-described embodiment of the present disclosure is merely a possible example of implementation, merely set forth for a clear understanding of the principles of the disclosure. Many variations and modifications may be made to the above-described embodiment of the disclosure without departing substantially from the spirit and principles of the disclosure.

The invention claimed is:

1. A combine harvester comprising:
   a frame;
   two axial-flow crop processing rotors mounted to the frame and arranged side-by-side and each having a longitudinal rotation axis;
   an inner support structure located between, and extending parallel to, the two rotors, the inner support structure being moveably mounted to the frame by a first linkage;
   two outer support structures located outboard of, and extending parallel to, the two rotors, the outer support structures being moveably mounted to the frame by respective second and third linkages;
   wherein the inner support structure and two outer support structures are configured to carry first and second pluralities of concave grate segments at a radial distance from the respective rotors; and,
   a concave adjustment system comprising a first actuator coupled to the first linkage and configured to raise and lower the inner support structure, and a second actuator coupled to the second and third linkages and configured to raise and lower said two outer support structures;
   wherein the first linkage comprises a first rockshaft mounted to the frame and aligned perpendicular to the rotation axis, and wherein the second and third linkages comprise and share a second rockshaft that is arranged coaxial to the first rockshaft;
   wherein the second and third linkages comprise and share a third rockshaft, and wherein the first and second rockshafts are offset from the third rockshaft in the longitudinal direction.

2. The combine harvester of claim 1, wherein the third rockshaft is coupled to the second rockshaft by a pair of cranks and a link arm.

3. The combine harvester of claim 1, wherein the first linkage comprises fore and aft cranks pivotally mounted to the frame, wherein a distal end of each crank is connected to the inner support structure by a hanger, and wherein the first actuator is connected between the frame and the first rockshaft.

4. The combine harvester of claim 3, wherein the fore and aft cranks each comprise a bell crank.

5. The combine harvester of claim 3, wherein the fore and aft cranks are coupled together by a tie bar.

6. The combine harvester of claim 3, wherein the first rockshaft comprises a rockshaft crank that is coupled to one of the fore and aft cranks.

7. The combine harvester of claim 1, wherein the second linkage and the third linkage each comprise fore and aft cranks that extends from the second rockshaft and third rockshaft respectively, wherein the fore and aft cranks are each coupled to the associated outer support structure by respective hangers, wherein the second actuator is connected between the frame and an input crank which extends from the second rockshaft.

8. The combine harvester of claim 1, further comprising said first and second pluralities of concave grate segments, wherein each concave grate segment is hinged at an inboard side to the inner support structure and secured at an outboard side to one of said two outer support structures.

9. The combine harvester of claim 7, further comprising a rotor drive system that is drivingly connected to the rotors and is configured to drive the two rotors in mutually opposite directions wherein an inboard side of the rotors turn upwardly, and wherein the outboard sides of the concave grate segments correspond to a concave inlet and the inboard sides of the concave grate segments correspond to a concave outlet.

10. The combine harvester of claim 1, wherein the first and second actuators are electric actuators.

11. The combine harvester of claim 1, further comprising a releasable locking mechanism which is configured to lock the first rockshaft to the second rockshaft.

12. The combine harvester of claim 8, wherein the releasable locking mechanism is configured to selectively lock the first rockshaft to the second rockshaft in a plurality of alternative relative positions.

13. A combine harvester comprising:
    a frame;
    two axial-flow crop processing rotors mounted to the frame and arranged side-by-side and each having a longitudinal rotation axis;
    an inner support structure located between, and extending parallel to, the two rotors, the inner support structure being moveably mounted to the frame by a first linkage;
    two outer support structures located outboard of, and extending parallel to, the two rotors, the outer support structures being moveably mounted to the frame by respective second and third linkages;
    wherein the inner support structure and two outer support structures are configured to carry first and second pluralities of concave grate segments at a radial distance from the respective rotors; and,
    a concave adjustment system comprising a first actuator coupled to the first linkage and configured to raise and lower the inner support structure, and a second actuator coupled to the second and third linkages and configured to raise and lower said two outer support structures;
    a rotor drive system that is drivingly connected to the rotors and is configured to drive the two rotors in mutually opposite directions wherein an inboard side of the rotors turn upwardly, and wherein the outboard sides of the concave grate segments correspond to a concave inlet and the inboard sides of the concave grate segments correspond to a concave outlet;
    wherein the first linkage comprises a first rockshaft mounted to the frame and aligned perpendicular to the rotation axis, and wherein the second and third linkages comprise and share a second rockshaft that is arranged coaxial to the first rockshaft;
    wherein the second linkage and the third linkage each comprise fore and aft cranks that extends from the second rockshaft and third rockshaft respectively, wherein the fore and aft cranks are each coupled to the associated outer support structure by respective hangers, wherein the second actuator is connected between the frame and an input crank which extends from the second rockshaft.

* * * * *